(12) United States Patent
Yamaguchi et al.

(10) Patent No.: US 6,943,856 B2
(45) Date of Patent: Sep. 13, 2005

(54) REFLECTION PLATE, REFLECTION TYPE LIQUID CRYSTAL DISPLAY APPARATUS, AND METHOD OF MANUFACTURING THE SAME

(75) Inventors: Yuichi Yamaguchi, Tokyo (JP); Hidenori Ikeno, Tokyo (JP); Takahiko Watanabe, Tokyo (JP); Fumihiko Matsuno, Tokyo (JP); Hironori Kikkawa, Tokyo (JP); Michiaki Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 09/984,258

(22) Filed: Oct. 29, 2001

(65) Prior Publication Data

US 2002/0075432 A1 Jun. 20, 2002

(30) Foreign Application Priority Data

Nov. 8, 2000 (JP) .................................... 2000-340171
Mar. 26, 2001 (JP) .................................... 2001-088101

(51) Int. Cl.$^7$ ........................................... G02F 1/1335
(52) U.S. Cl. ........................................ 349/67; 349/113
(58) Field of Search .................. 349/67, 113, FOR 161

(56) References Cited

U.S. PATENT DOCUMENTS

| 4,519,678 A | 5/1985 | Komatsubara et al. |
| 5,204,765 A | * 4/1993 | Mitsui et al. ............... 349/113 |
| 5,973,843 A | 10/1999 | Nakamura |
| 6,097,458 A | * 8/2000 | Tsuda et al. ................ 349/113 |

FOREIGN PATENT DOCUMENTS

| EP | 0 495 679 A2 | 7/1992 | |
| EP | 495679 A2 * | 7/1992 | ............ G02B/5/02 |
| JP | 57-94718 A | 6/1982 | |
| JP | 6-11711 A | 1/1994 | |
| JP | 6-75238 | 3/1994 | |
| JP | 7-218906 A | 8/1995 | |
| JP | 8-87009 | 4/1996 | |
| JP | 8-18446 A | 7/1996 | |
| JP | 9-80426 | 3/1997 | |
| JP | 2825713 | 9/1998 | |
| JP | 11-133399 A | 5/1999 | |
| JP | H11-183714 | 7/1999 | |
| JP | 11-258596 A | 9/1999 | |
| JP | 11-281972 A | 10/1999 | |
| JP | 2000-105370 | 4/2000 | |
| JP | 2000-292785 A | 10/2000 | |
| JP | 2001-5015 A | 1/2001 | |
| JP | 2001-100187 A | 4/2001 | |

* cited by examiner

Primary Examiner—Paul E Brock, II
(74) Attorney, Agent, or Firm—Sughrue Mion, PLLC

(57) ABSTRACT

To provide a reflection plate and a reflection type liquid crystal display apparatus, in which a light from a light source of a fluorescent light or the sun light can be effectively used to thereby increase an amount of lights to be reflected to an observer side so that a bright display can be obtained, and a method of manufacturing the same.

26 Claims, 13 Drawing Sheets

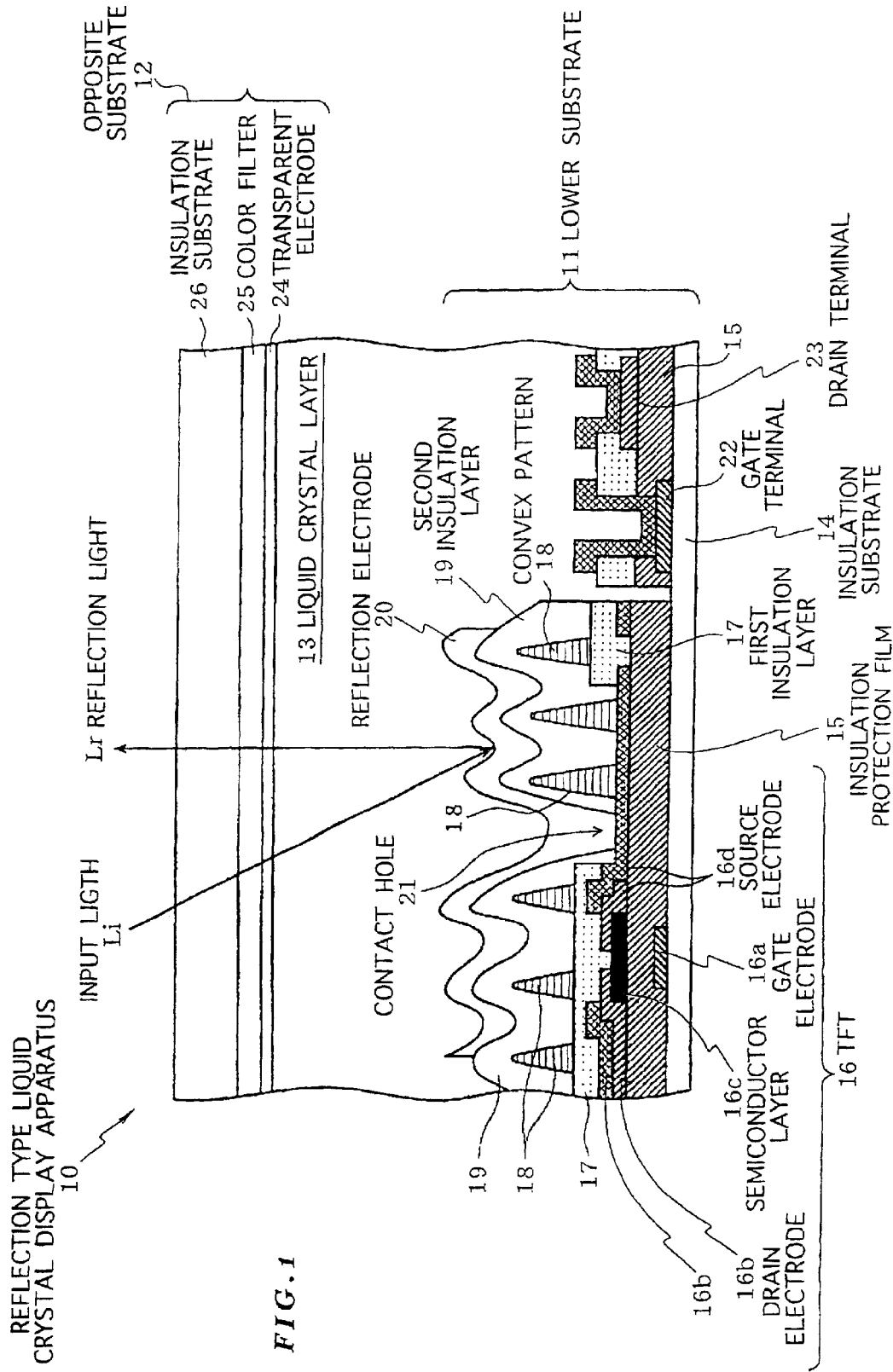

*FIG.2(a)*          *FIG.2(b)*
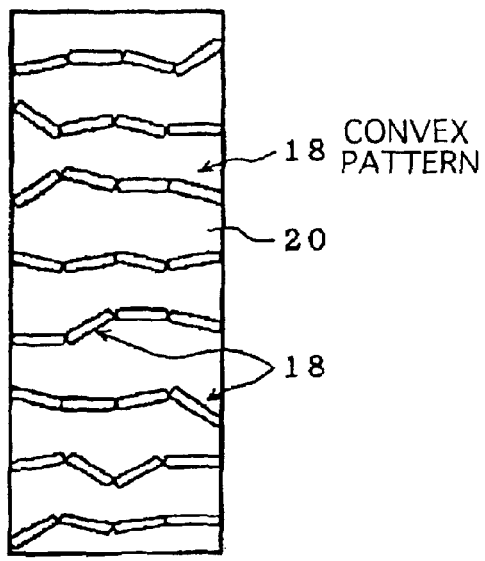
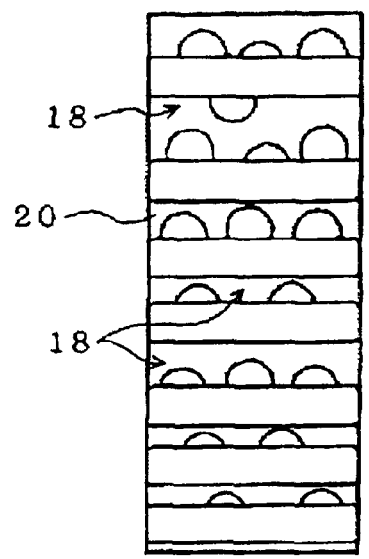
*FIG.3*
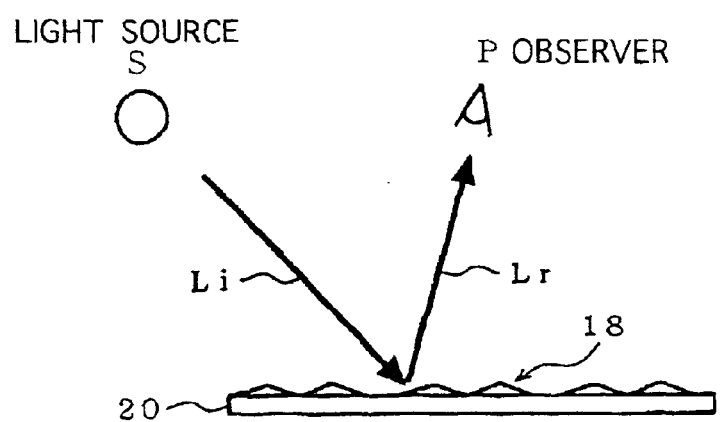

FIG.6

| | BASIC FIGURE | REFLECTION PLATE SHAPE | | BASIC FIGURE | REFLECTION PLATE SHAPE |
|---|---|---|---|---|---|
| (a) | TRIANGLE Ratio = 35[%] | | (d) | STRAIGHT LINE Ratio = 100[%] | |
| (b) | QUADRANGLE Ratio = 47[%] | | (e) | MULTI-POINT STRAIGHT LINE Ratio = 60[%] | |
| (c) | HEXAGON Ratio = 34[%] | | (f) | RECTANGLE Ratio = 47[%] | |

FIG. 7
| | BASIC FIGURE | | | | |
|---|---|---|---|---|---|
| | TRIANGLE | QUADRANGLE | RHOMBUS | HEXAGON | U-SHAPE |
| NAME | STDtr | STDsikaku | STDhishi | STDHex1 | STD_Ugata1 |
| PATTERN |  | 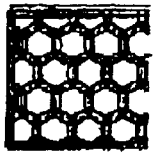 | 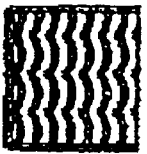 | 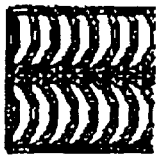 | 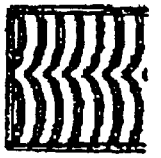 |
| NAME | | | | STDHex2 | STD_Ugata2 |
| PATTERN | | | | 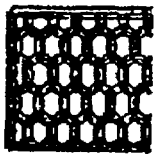 |  |
| NAME | | | | STDHex3 | STD_Ugata3 |
| PATTERN | | | |  |  |
| NAME | | | | | STD_Ugata4 |
| PATTERN | | | | | 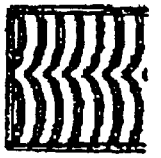 |

REFLECTION PLATE, REFLECTION TYPE LIQUID CRYSTAL DISPLAY APPARATUS, AND METHOD OF MANUFACTURING THE SAME

BACKGROUND OF THE INVENTION

1. Field of the Invention

The present invention relates to a reflection plate, a reflection type liquid crystal display apparatus, and a method of manufacturing the same, and more particularly relates to a reflection plate and a reflection type liquid crystal display apparatus which reflect an input light from outside (external portion) and then use it as a display light source, and a method of manufacturing the same.

2. Description of the Related Art

Conventionally, a reflection type liquid crystal display (LCD) apparatus is known which has a reflection plate within the apparatus and reflects an input light from external portion by using this reflection plate and, then uses it as a display light source so that it does not require a back light as a light source.

As such a conventional reflection type liquid crystal display apparatus, for example, there is a display apparatus in which isolated convex portions are formed on the surface of a reflection plate by using a photo-lithography process while organic insulation film is left, and interlayer film is formed on the convex portions, and smoothed concave and convex structure provided with mountain sections composed of the convex portions and valley sections composed of other portions are formed, and the concave and convex pattern is formed on the surface of the reflection plate (refer to Japanese Patent No. 2825713).

FIG. 14 is a plan view showing an example of the concave and convex pattern formed on a conventional reflection plate. As shown in FIG. 14, a concave and convex pattern 1 is configured such that a plurality of respectively isolated convex portions 3 are formed on a reflection plate 2, in which they are used as the basic convex pattern.

However, in a case of the conventional reflection plate 2, its object is to reflect the input light while scattering with predetermined angular range. Thus, the scattering of light is strong, and the input light is substantially regularly reflected so that the reflection direction is circular-corn-shaped.

FIG. 15 is an explanation view showing the relation between the input light and the reflection light resulting from the reflection plate in FIG. 14. As shown in FIG. 15, an input light Li of fluorescent light or sun light, which is inputted from a front direction of an observer viewing a screen of the reflection type liquid crystal display apparatus, is reflected on the reflection plate 2, and it becomes a reflection light Lr, which is scattered substantially regularly wide direction.

At a results, there is a following problem in an environment in which a dominant emission of a strong light (direct light) of a fluorescent light from a particular direction in a room and an input light (indirect light) inputted to a panel through a reflection on a wall is weak. That is, the reflection plate 2 composed of the conventional concave and convex pattern using a substantially circular pattern can not efficiently reflect the light from the particular direction to an observer side. Thus, it is not possible to effectively use the input light to the panel. Hence, the reflection light to the observer side is weak, which leads to the dark display.

It is therefore an object of the present invention to provide a reflection plate and a reflection type liquid crystal display apparatus, in which a light from a light source having a strong energy, such as a fluorescent light or the sun light is effectively used to thereby increase an amount of lights to be reflected to an observer side so that a bright display can be obtained, and a method of manufacturing the same.

SUMMARY OF THE INVENTION

In order to achieve the above-mentioned object, a reflection plate according to the present invention is characterized in that in a reflection plate used in a reflection type liquid crystal display apparatus using an input light from external portion as a display light source, a light outputted from the light source is reflected to an observer side, on the plane including the light source and the screen and the observer viewing a screen.

The above-mentioned configuration enables the reflection plate used in the reflection type liquid crystal display apparatus using the input light from the external portion as the display light source to give an anisotropy for a light reflection direction with respect to the input light from the external portion, and also enables the effective usage of a light from a light source existing within a substantial extension plane including a line through which a screen and an observer viewing the screen are linked. Thus, it is possible to effectively use a light from a light source having a strong energy such as a fluorescent light or the sun light, and thereby increase an amount of lights to be reflected to the observer side, and accordingly obtain a bright display even under an environment with a strong direct light.

Also, a method of manufacturing a reflection plate according to the present invention can manufacture the above-mentioned reflection plate. The reflection type liquid crystal display apparatus according to the present invention can achieve the reflection type liquid crystal display apparatus having the above-mentioned reflection plate. The method of manufacturing the reflection type liquid crystal display apparatus according to the present invention can achieve the above-mentioned reflection type liquid crystal display apparatus.

BRIEF DESCRIPTION OF THE DRAWINGS

FIG. 1 is a partially sectional view showing a reflection type liquid crystal display apparatus according to an embodiment of present invention;

FIG. 2A is a plan view showing an example of convex patterns formed on a reflection electrode of FIG. 1 and FIG. 2B is a plan view showing another example of convex patterns formed on a reflection electrode of FIG. 1;

FIG. 3 is an explanation view showing a reflection light through the convex pattern of FIGS. 2A, 2B;

FIG. 6 is explanation view showing examples of the convex pattern on the basis of a unit figure of FIG. 5;

FIG. 7 is an explanation view showing an examples of a basic figure pattern to form the convex pattern of FIG. 6;

DETAILED DESCRIPTION OF THE PREFERRED EMBODIMENTS

Figure 4A:
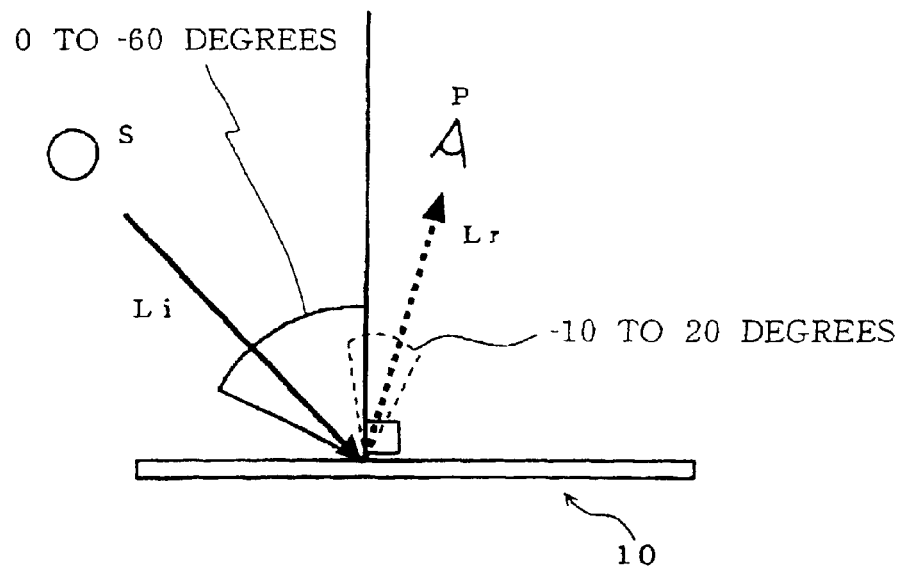
FIG. 4A is a explanation view from side showing a positional relation between a direct light, a reflection type liquid crystal display apparatus and an observer

Preferred embodiments of the present invention will be explained below with reference to the drawings.

FIG. 1 is a partially sectional view of a reflection type liquid crystal display apparatus according to an embodiment of the present invention. As shown in FIG. 1, a reflection type liquid crystal display apparatus 10 has a lower substrate 11, an opposite substrate 12 located opposite to the lower substrate 11, and a liquid crystal layer 13 sandwiched between the lower substrate 11 and the opposite substrate 12, within the apparatus.

This reflection type liquid crystal display apparatus 10 employs an active matrix system, for example, in which a thin film transistor (TFT) is placed for each pixel as a switching element.

The lower substrate 11 has an insulation substrate 14, an insulation protection film 15, a TFT 16, a first insulation layer 17, a convex pattern 18, a second insulation layer 19, and a reflection electrode 20. The insulation protection film 15 is laminated on the insulation substrate 14. The TFT 16 is formed on the insulation protection film 15. The TFT 16 has a gate electrode 16a on the insulation substrate 14, a drain electrode 16b on the insulation protection film 15 covering the gate electrode 16a, a semiconductor layer 16c, and a source electrode 16d.

The convex pattern 18 is formed on the insulation protection film 15 and the TFT 16, via the first insulation layer 17 or the source electrode 16d of the TFT 16. The second insulation layer 19 is laminated so as to cover this convex pattern 18, the first insulation layer 17 and the source electrode 16d. A contact hole 21 reaching the source electrode 16d is made in the second insulation layer 19.

Moreover, the reflection electrode 20 is laminated so as to cover the second insulation layer 19 together with the contact hole 21. The reflection electrode 20 is connected to the drain electrode 16b or the source electrode 16d of the TFT 16, and it has the functions as a reflection plate and a pixel electrode.

Also, together with a gate terminal unit 22 on the insulation substrate 14, a drain terminal unit 23 on the insulation protection film 15 for covering the gate terminal unit 22 is formed in the terminal region placed in the circumference of the lower substrate 11.

The opposite substrate 12 has a transparent electrode 24, a color filter 25 and an insulation film 26 which are laminated in this order from the liquid crystal layer 13. An input light Li inputted from this insulation substrate 26 to the opposite substrate 12 reaches the lower substrate 11 through the liquid crystal layer 13 from the opposite substrate 12.

Then, it is reflected by the reflection electrode 20 to thereby become a reflection light Lr. It is again passed through the liquid crystal layer 13, and outputted from the transparent electrode 24 to the external portion of the opposite substrate 12.

FIGS. 2A, 2B are plan views showing an example of the convex patterns formed on the reflection electrode of FIG. 1. As shown in FIGS. 2A, 2B, the convex pattern 18 is formed on the surface of the reflection electrode (reflection plate) 20.

This convex pattern 18 functions as a base of a concave and convex pattern (having a concave and convex shape) formed on the surface of the reflection electrode 20. It is formed, for example, by lining up bar members bent in the middle (refer to FIG. 2A), or by combining a member whose flat plane is circular and a member whose flat plane has a thin plane shape (refer to FIG. 2B) so that a line component in a lateral direction along the surface of the reflection electrode 20 is greater.

That is, the convex pattern 18 is configured such that it has the directivity, in which the greater part of the lights inputted to the reflection electrode 20 from a particular direction are reflected to the side of the observer viewing the screen of the reflection type liquid crystal display apparatus 10.

FIG. 3 is an explanation view showing the reflection light resulting from the convex pattern of FIGS. 2A, 2B. As shown in FIG. 3, an input light Li from a light source S located in a front direction of an observer P is reflected on the convex pattern 18 of the reflection electrode 20. Most of the reflection lights become the reflection lights Lr directed to the direction of the observer's eye viewing the screen.

In short, the concave and convex pattern is located along the surface of the reflection electrode 20, and it is formed by the convex pattern 18 in which an average inclination angle corresponding to the elements formed in a longitudinal direction implying a direction where the input light Li and the observer P are linked is different from an average inclination angle corresponding to the elements formed in a lateral direction orthogonal to the longitudinal direction.

As a result, the concave and convex pattern 18 is formed by a polygonal base, in which a line component along the transverse direction is greater. So, since the line component in the lateral direction is greater, the plane on which the input lights Li from the front direction of the observer P are reflected to the observer P side is widely formed, which thereby enables the input lights Li to be efficiently reflected to the observer P side.

Thus, as compared with a reflection electrode in which the line component in the lateral direction is smaller than a component in the other direction, it is possible to effectively use the direct light whose light source is the fluorescent light or the sun light. Thus, it is possible to provide the reflection type liquid crystal display apparatus having the brighter screen.

Here, the particular direction and the observer side direction are described. The particular direction implies the direction of the existence of an external light (direct light) having a strong illuminance, in the external light that may input to the reflection electrode 20 from the external portion of the reflection type liquid crystal display apparatus 10. This direction of the existence of the direct light is the direction in which a lighting device such as a fluorescent light and the like is located, in a case of an interior of a room, and the direction of the sun light in a case of an exterior of a room.

Also, in a case of a small portable terminal device having the reflection type liquid crystal display apparatus 10, its direction can be freely changed. Thus, it may be considered that the observer uses the device by moving it to a position at which the observer can view the screen in the easiest condition.

Figure 4B:
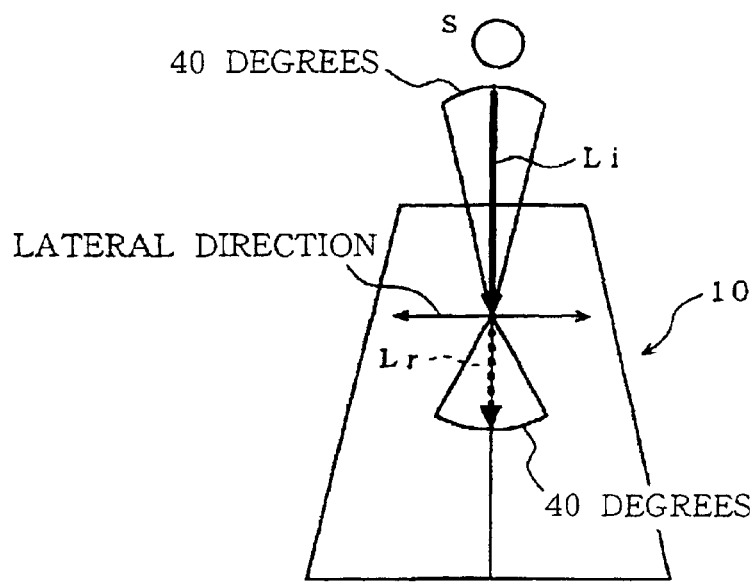
FIG. 4B is a explanation view from front side thereof.

FIG. 4 is an explanation view showing a positional relation between the direct light, the reflection type liquid crystal display apparatus and the observer. As shown in FIG. 4, the position at which the observer P can view the screen in the easiest condition is usually the position when the direct light from the light source S inputted to the reflection electrode 20, a reflection point of the reflection type liquid crystal display apparatus 10 and the observer P viewing the screen exist on the same plane including a normal line at the reflection point of the reflection type liquid crystal display apparatus 10 (refer to FIGS. 4A, 4B). Thus, the direction, which satisfies those positional relation, is defined as the particular direction and the observer side direction.

Its expanse range is determined on the basis of various related factors, such as the structure of the lighting device, an interval from the observer's eyes or a distance from the device, and the like. With respect to the normal line direction, the input light Li is from 0 to about −60 degrees, and the reflection light Lr is from about −10 to about +20 degrees. Also, with respect to the lateral direction along the screen, both the input light Li and the reflection light Lr are about 40 degrees (from about −20 degrees to about +20 degrees).

Next, the lateral direction and its ratio will be described below. The lateral direction is assumed to be a direction orthogonal to a straight line through which the observer P and the light source S are linked (refer to FIG. 4B) In a case of the reflection electrode 20 according to the present invention, as compared with the conventional case in which the lights are uniformly collected from all directions (360 degrees), it is desired that an intensity of the light from the particular direction (in the range of about +20 degrees to about −20 degrees from the longitudinal direction) is two times or more. To attain such optical property, in the concave and convex pattern of the reflection electrode 20, it is desirable that the ratio of the angular range from about +10 degrees to about −10 degrees in the lateral direction is about 20% or more of the whole.

Figure 5:
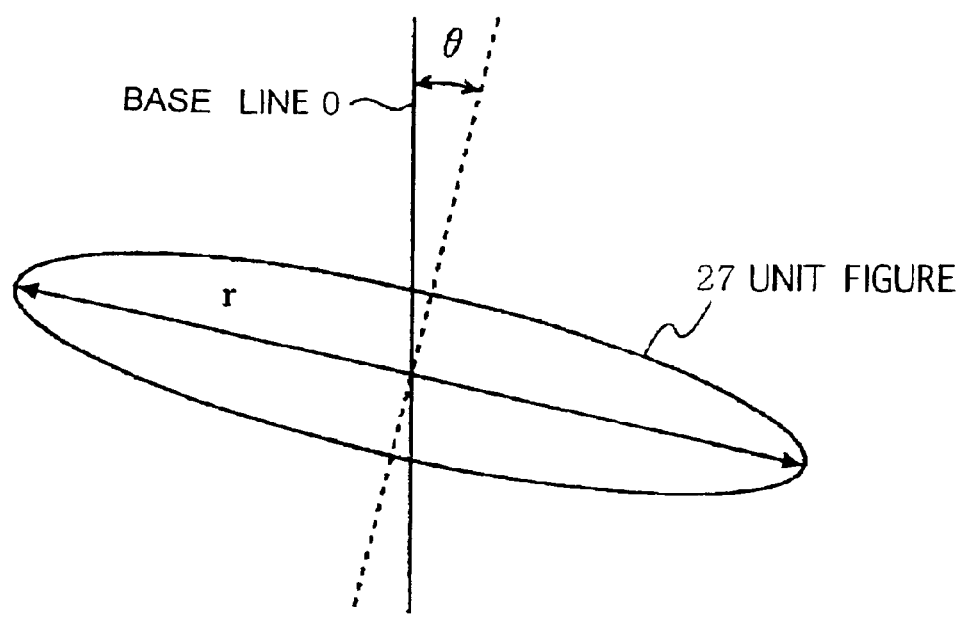
FIG. 5 is an explanation view showing a condition with regard to the shape of the convex pattern of FIGS. 2A, 2B.

FIG. 5 is an explanation view with regard to the shape of the convex pattern in FIGS. 2A, 2B. As shown in FIG. 5, the convex pattern 18 (refer to FIGS. 2A, 2B) on the reflection electrode 20 is formed by a unit FIG. 27 having the anisotropy in which a length of a major axis direction is different from that of a minor axis direction.

Here, it is defined that a length of the major axis of the unit FIG. 27 is r, an angle between a base line O and the minor axis direction (orthogonal direction to the major axis direction) is θ [degrees], the number of the unit FIGS. 27 forming the convex pattern 18 on the reflection electrode 20 is n, and a length of the major axis direction of each unit FIG. 27 is rn. If the unit figures are classified depending on the angle condition (θ<−20 or θ>20, −20≦θ≦20), a sum Lterget of the major axis direction lengths, a sum Lall of all major axis direction lengths, and an effective line ratio Ratio are represented by:

$$L_{terget} = \sum_{n=1}^{n} \begin{array}{l} 0(\theta < -20 \text{ or } \theta > 20) \\ r_n(-20 \leq \theta \leq 20) \end{array}$$ [Equation 1]

$$L_{all} = \sum_{n=1}^{n} r_n$$

$$Ratio = (L_{terget} / L_{all}) \times 100$$

If the major axis of the unit figures are homogeneous to every direction, the effective line ratio is about 22%. Increasing this effective line ratio to about 22% or more, preferably to about 33% (about 1.5 times) enables the light from the base direction O (or it's orthogonal direction) to be efficiently used.

FIGS. 6A to 6F are explanation views showing examples of the convex pattern based on the unit figure in FIG. 5. FIGS. 6A to 6F contrastively show the shapes of the reflection electrodes 20 on which the various convex patterns 18 are formed and the figures serving as the bases to form the convex patterns 18 (refer to FIGS. 6A to 6F). The basic figures are formed by randomly placing the unit FIGS. 27. They illustrate the representative shapes among the various formed shapes.

Here, the effective line ratios in the convex pattern shapes of the respective reflection electrodes 20 are compared with each other. If the basic figure is hexagonal (refer to FIG. 6C), it is about 34%. In a case of a triangle (refer to FIG. 6A), it is about 35%. In a case of a quadrangle (refer to FIG. 6B) or a rectangle (refer to FIG. 6F), it is about 47%. In a case of a multi-point straight shape (refer to FIG. 6E), it is about 60%. And, in a case of a linear shape (refer to FIG. 6D), it is about 100%.

In short, it is desired to form the convex pattern 18 composed of a figure based on a polygon, which has many lines in the lateral direction.

FIG. 7 is an explanation view showing examples of basic figure patterns to form the convex patterns in FIGS. 6A to 6F. FIG. 7 contrastively shows the basic figure patterns to form the various convex patterns (refer to FIGS. 6A to 6F) and the various basic figures serving as the originals for the basic figure patterns.

As the respective basic figure patterns, for example, there are STDtr whose basic figure is a triangular, STDsikaku whose basic figure is a quadrangular, STDhishi whose basic figure is a rhombus, STDHex1~3 whose basic figure is hexagonal, and STDUgata1~4 whose basic figure is U-shaped.

When the convex pattern 18 (refer to FIGS. 6A to 6F) is designed, the unit FIG. 27 (refer to FIG. 5) is firstly used to draw this basic figure pattern. Next, the positions of the vertexes of the basic figure pattern are shifted, placed and changed to accordingly form the desirable convex pattern 18.

At this time, as the basic pattern, a straight line (a line in the lateral direction), a triangle, a quadrangle, a hexagon, compressed figures of them, a rectangle, an ellipse, a U-shape, a rhombus, a V/U structure and the like, rotated patterns of them, or enlarged or contracted patterns of them or the like are used. As a parameter, a length of one side, a width of a line, a pitch, or randomness or the like are used.

FIGS. 8A to 8D are explanation views showing a process for manufacturing a reflection electrode, in the process for manufacturing the reflection type liquid crystal display apparatus shown in FIG. 1. As shown in FIGS. 8A to 8D, a substrate of TFT 16 serving as a switching element is firstly formed (refer to FIG. 8A).

A gate electrode 16a is formed on the insulation substrate 14, and an insulation protection film 15 is laminated. Then, a drain electrode 16b, a semiconductor layer 16c and a source electrode 16d are respectively formed on the insulation protection film 15. Moreover, a first insulation layer 17 is laminated so as to cover the TFT 16.

By the way, the switching element is not limited to the TFT 16. For example, a substrate of another switching element, such as a diode and the like, can be formed.

Figure 8A:
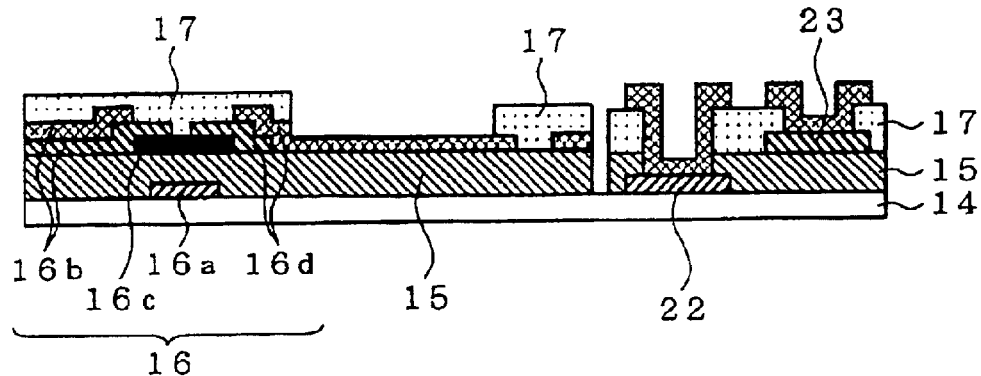
FIGS. 8A to 8D are explanation views showing a process for manufacturing a reflection electrode, in a process for manufacturing the reflection type liquid crystal display apparatus shown in FIG. 1.
Figure 8B:
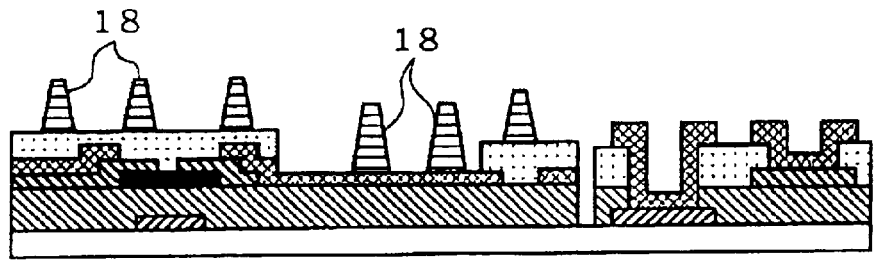

After organic resin is coated on the first insulation layer 17, exposing and developing processes are carried out to form the convex patterns 18 of a plurality of conditions so as to form the concave and convex pattern on the surface of the reflection electrode 20 by using a convex pattern formation mask (refer to FIG. 8B). After that, a heat baking operation for the organic resin is carried out (refer to FIG. 8C).

Next, the interlayer film made of the organic resin is coated so as to cover the convex pattern 18. After the formation of the smoothed concave and convex shape, a contact hole 21 is made by carrying out the exposing and developing processes. After that, the heat baking operation for the interlayer film is carried out to accordingly form a second insulation layer 19 (refer to FIG. 8D).

Then, aluminum (Al) thin film for covering the second insulation layer 19 together with the contact hole 21 is formed corresponding to the formation position of the reflection electrode 20. After that, the exposing and developing processes are carried out to accordingly form the reflection electrode 20 serving as a reflecting pixel electrode (refer to FIG. 1). By the way, the material for the reflection electrode 20 is not limited to Al. It may be made of another conductive material.

In this process for manufacturing the reflection electrode, the organic interlayer film (concave and convex layer) between the Al film and the TFT substrate may be made with one layer as well as two layers.

As mentioned above, the concave and convex portions are formed on the surface of the reflection electrode 20. However, in the organic material to form the concave and convex portions and the like, their shapes are changed depending on the exposing, developing and heating processes. Thus, the obvious difference of reflection character is never brought about, for example, by the pattern difference of the basic figure, such as the rhombus, the ellipse and the like. Also, in the case of the rectangle, or even if the lengths of the longer sides are different from each other, the difference in the finally concave and convex shapes is never brought about by making the patterns closer to each other.

Thus, as the shape as the base of a light shield unit (or an optically transparent unit) of the mask used in the process for forming the convex film 18 serving as the base, it is important to use the combination of the shapes having the two-axis property of the major axis and the minor axis.

By the way, this embodiment has been described with the rectangle as the standard. However, even if it is rhombus-shaped or ellipse-shaped, this naturally has no influence on the effectiveness of the present invention. Also, at this time, the respective figures need not be perfectly independent of each other. They may be superimposed on each other or connected to each other.

Figure 9:
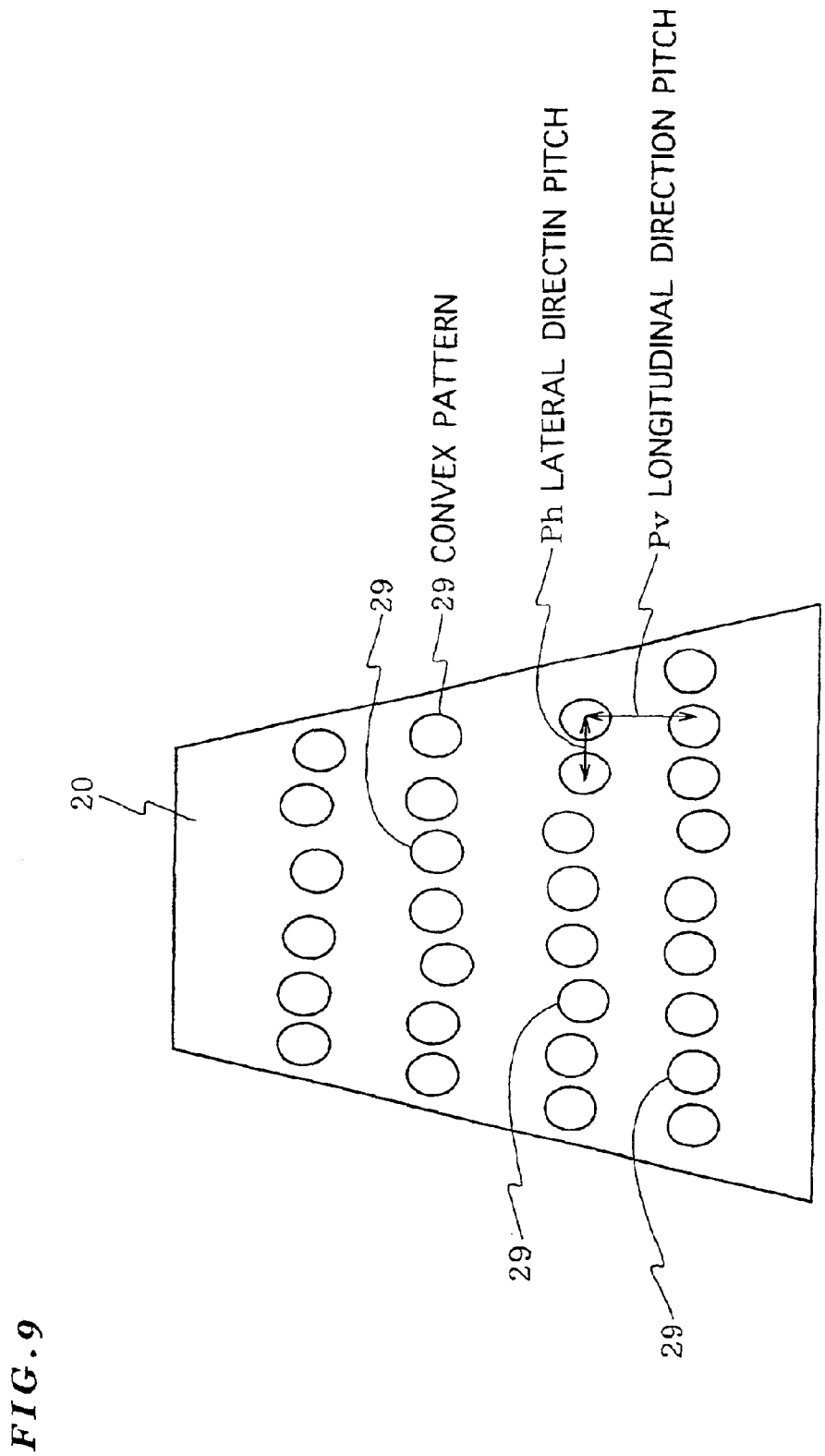
FIG. 9 is a plan view showing another example of the convex pattern formed on the reflection electrode of FIG. 1.

FIG. 9 is a plan view showing another example of the convex pattern formed on the reflection electrode in FIG. 1. As shown in FIG. 9, convex patterns 29 formed on the reflection electrode 20 are designed such that their flat planes are substantially circular, and their lateral directions are close to each other, and they are arranged independently of each other so as to provide a difference between an average of lateral direction pitches Ph and an average of longitudinal direction pitches Pv. Thus, even the independent convex patterns 29 that are substantially circular can further strongly reflect the input lights Li from the particular direction.

Also, the reflection plane of the reflection electrode 20 has the convex or concave portion, in which the light shield portion of the mask used for the formation of the convex pattern is reflected. When one convex pattern on the reflection plane is noted, it has the substantially contrastive structure with the vertex as the center.

By the way, by making the convex portion having the pattern (the light shield portion of the mask) of large size and the convex portion having the pattern of small size closer to each other, and increasing the film remaining on the large portion and decreasing the film remaining on the small portion, that is, by using two or more kinds of patterns having sizes different from each other, it is possible to form the inclined plane on the convex pattern.

In this way, according to the present invention, the bright reflection type liquid crystal display apparatus 10 can be provided by forming the concave and convex shape so as to reflect the greater part of the input lights Li from the particular direction, to the observer P side, on the surface of the reflection electrode 20 of the reflection type liquid crystal display apparatus.

In short, when a particular direction within an azimuth direction of the reflection electrode 20 is set at 0 degree, in order to increase the rate of a line segment (a line pattern) oriented to this particular direction, it is necessary to design the following main point. That is, as for the convex pattern 18 formed on the surface of the reflection electrode 20, the major axis and the minor axis have the anisotropy shapes different from each other, and they may be at any state of an isolated state or a linked state, and the directions of the major axis sides are converged into a certain direction.

Thus, in the case of the concave and convex pattern formed on the conventional reflection plate, the input lights are substantially uniformly reflected in the circular corn manner. However, in the case of the concave and convex pattern of the reflection electrode according to the present invention, the greater part of the input lights are reflected to the direction close to the observer's eyes viewing the screen.

Also, the reflection electrode 20 according to the present invention reflects the input light outputted from the light source to the observer P side, on the plane containing the light source, the screen and the observer P viewing the screen. Its surface is concave convex in shape. The lines through which the convex portion and the concave portion of this concave and convex shape or the respective middle portions of the convex portion and the concave portion art linked have many components substantially orthogonal to the direction in which the observer P and the light source are linked.

Moreover, the ratio of the component, where the lines through which the convex or concave portions in the concave and convex shape are linked exist in an angular range from about +10 degrees to about −10 degrees, when the direction substantially orthogonal to the line through which the observer P and the light source are linked is defined as a center, is 20% or more of the whole. The average inclination angle of the concave and convex portion formed in the direction in which the observer P and the light source in this concave and convex shape are linked is different (preferably, 0.5 degrees or more) from the average inclination angle of the concave and convex portion formed in the direction orthogonal to the above-mentioned direction.

By the way, in the above-mentioned embodiment, the concave and convex pattern formed on the surface of the reflection electrode 20 is formed with the convex pattern 18 as the base. However, it is not limited to the convex pattern 18. For example, the concave pattern may be used as the base of the concave and convex pattern.

Figure 10:
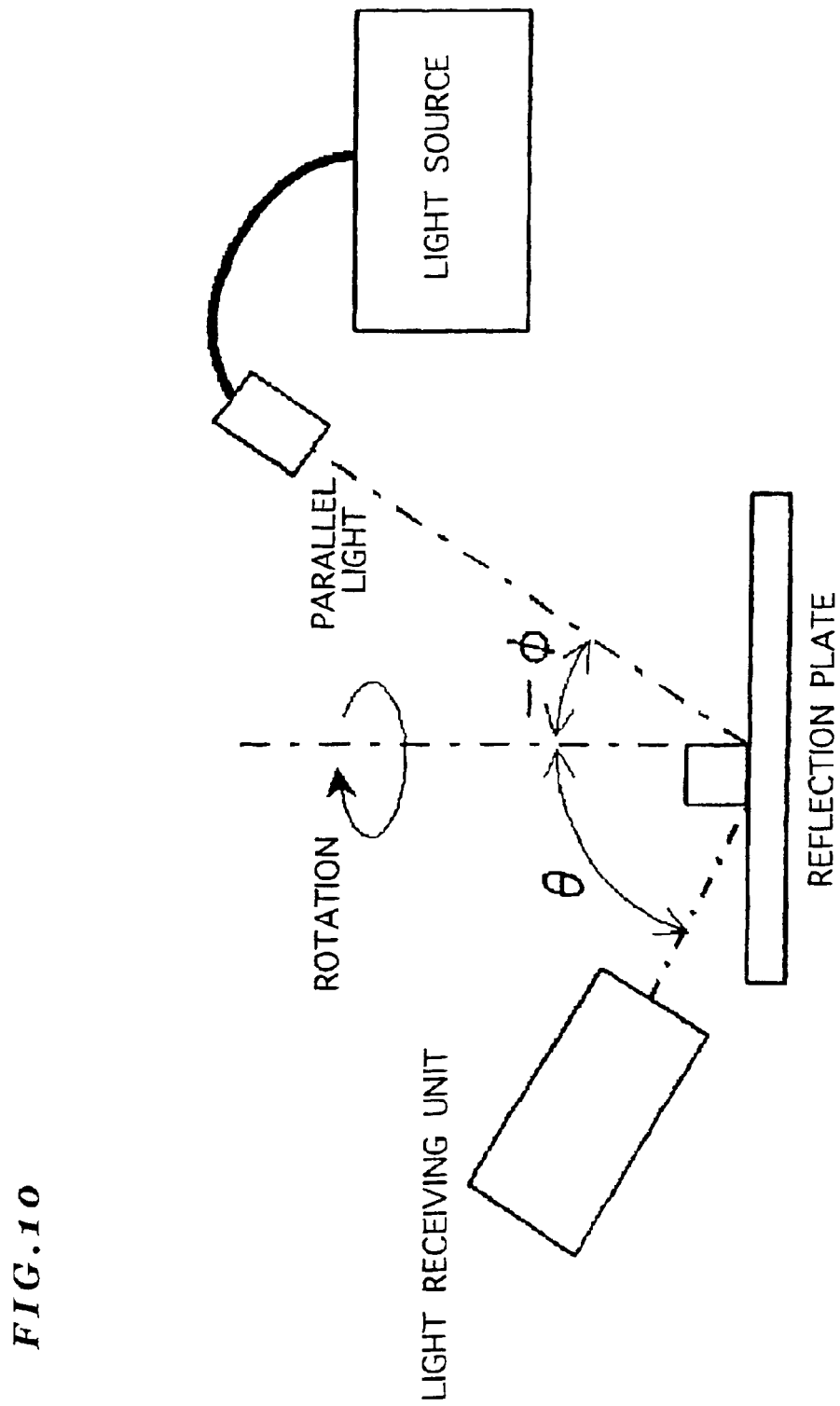
FIG. 10 is a schematic view showing an apparatus to illustrate a method of measuring a reflectance.
Figure 11:
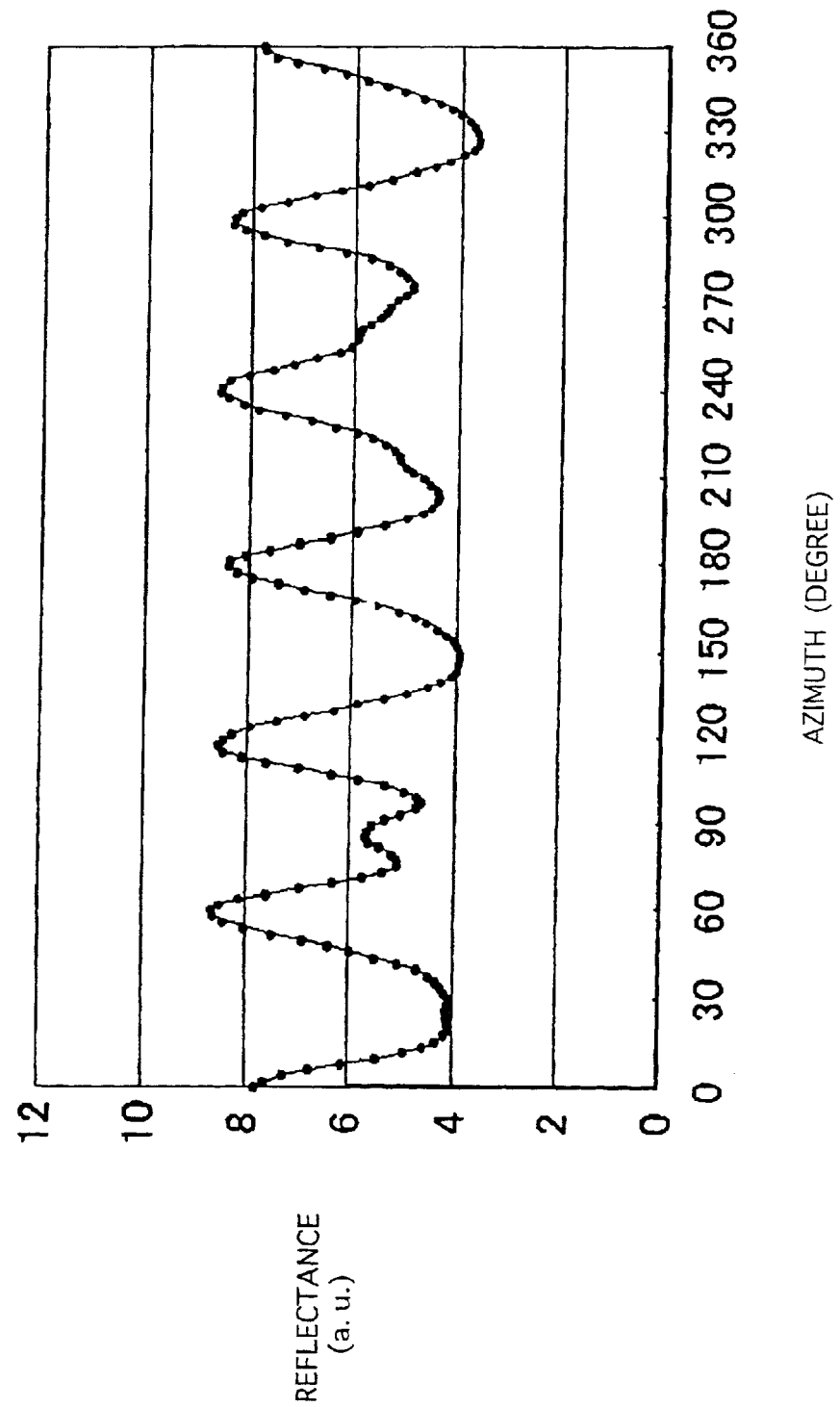
FIG. 11 is an explanation view showing a reflection property of the reflection plate of the present invention.

FIG. 10 shows an explanation view illustrating a method of measuring a reflection property of the reflection plate of the present invention. Also, FIG. 11 shows an example of the reflection property of the reflection plate of the present invention. The reflection property is measured such that parallel lights are inputted at an angle of −φ with respect to a direction vertical to the reflection plate, and a strength of the reflection light is measured by a light receiving unit mounted at an angle of θ with respect to the direction vertical to the reflection plate. The measured result shown in the FIG. 11 can be obtained by carrying out the above-mentioned measurement at various azimuths by changing the direction of the reflection plate while maintaining the angles of −φ and θ.

The reflection property of the reflection plate of the present invention is characterized in that it is different depending on the azimuth of the light inputted to the reflection plate, and an azimuth of a high reflectance and an azimuth of a low reflectance appear at a certain period. In this example, when a standard point of the measurement is assumed to be 0 degree and the reflection plate is rotated by 360 degrees, the reflectance is increased for each 60 degrees.

Figure 12:
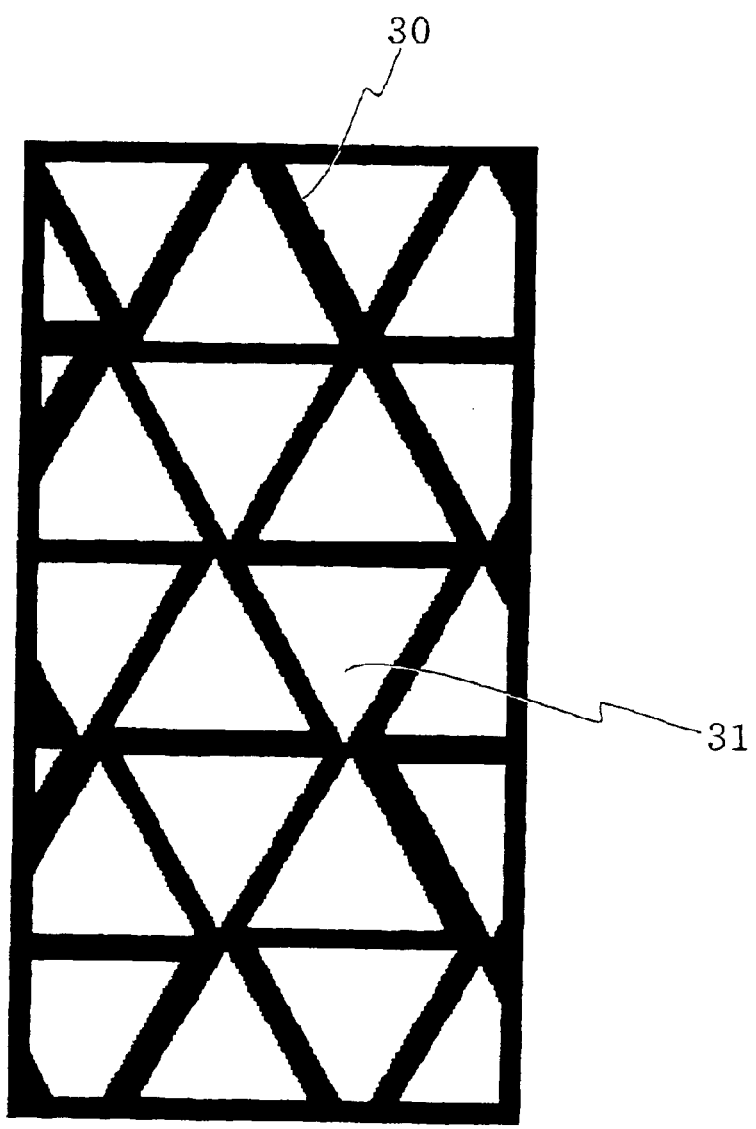
FIG. 12 is a plan view showing a shape of the reflection plate of the present invention.

FIG. 12 is a plan view showing the shape in another embodiment of the reflection plate of the present invention. The reflection plate of the present invention is concave and convex on the surface, and it is configured such that a concave portion 31 surrounded by the convex portion 30 of this concave and convex shape is triangular. It is characterized in that when the light source is inputted to the reflection plate, one side of the triangle is substantially orthogonal to the direction through which the observer and the light source are linked.

Such formation of the concave and convex shape enables the reflection property of the reflection plate to exhibit the anisotropy to the azimuth, as shown in FIG. 11. Also, if the azimuth in the existence of the observer is assumed to be 0 degree, it is possible to constitute the reflection plate, which can reflect the greater part of the lights to the observer side.

FIG. 12 shows the example in which the concave shape is triangular. However, the shape of the concave portion is not limited to the triangle. It may be a quadrangle or a further polygonal shape. The change in the shape changes the reflectance and the period of the anisotropy of the reflectance. Also, the reflection plate of the present invention is characterized in that an average distance between the vertexes of the polygon is 5 μm or more. In this way, the distance is 5 μm or more. Thus, the normal line components of the inclined plane formed over the convex portion and the concave portion can be uniformed so that the reflectance has the anisotropy to the azimuth.

Figure 13:
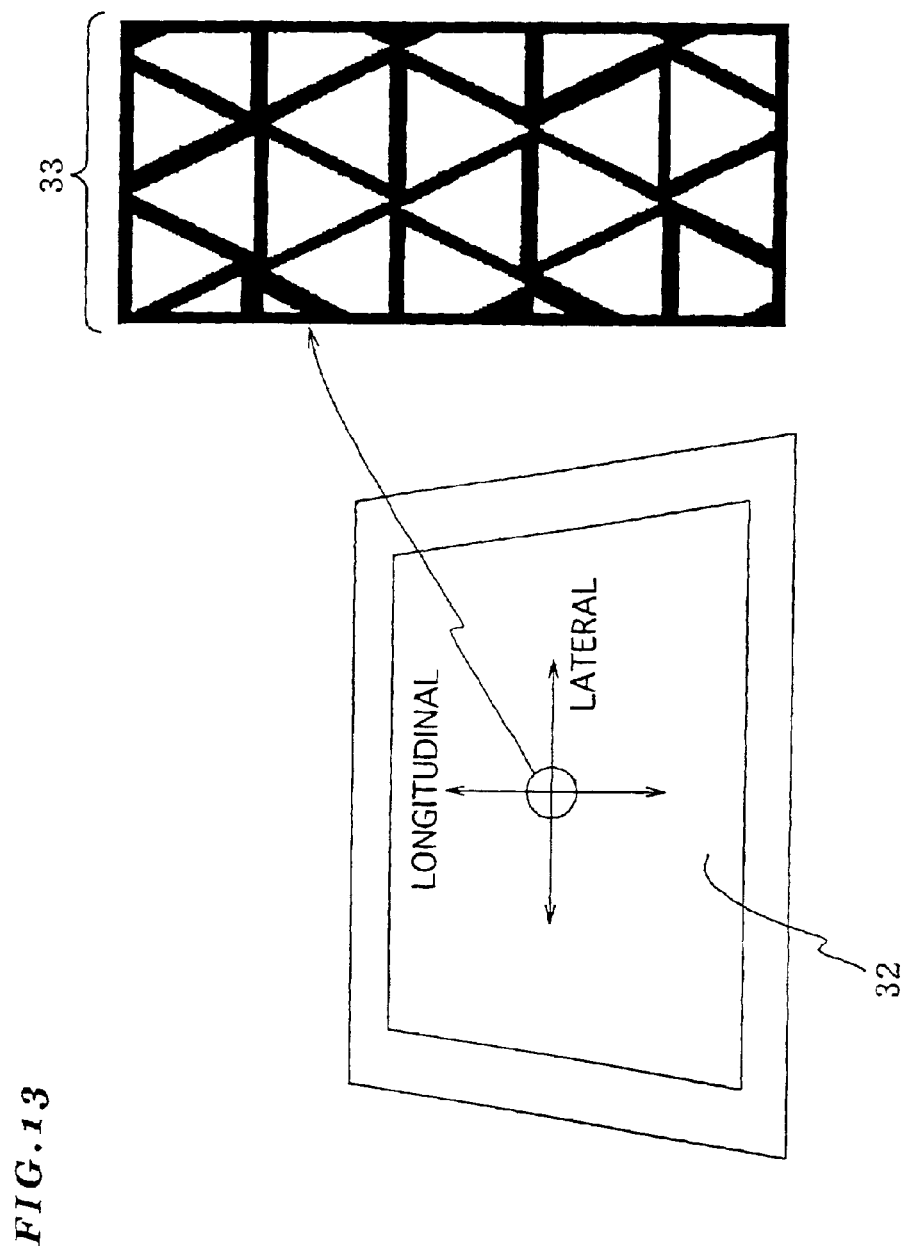
FIG. 13 is a plan view for illustrating the reflection type liquid crystal display apparatus of the present invention.
Figure 14:
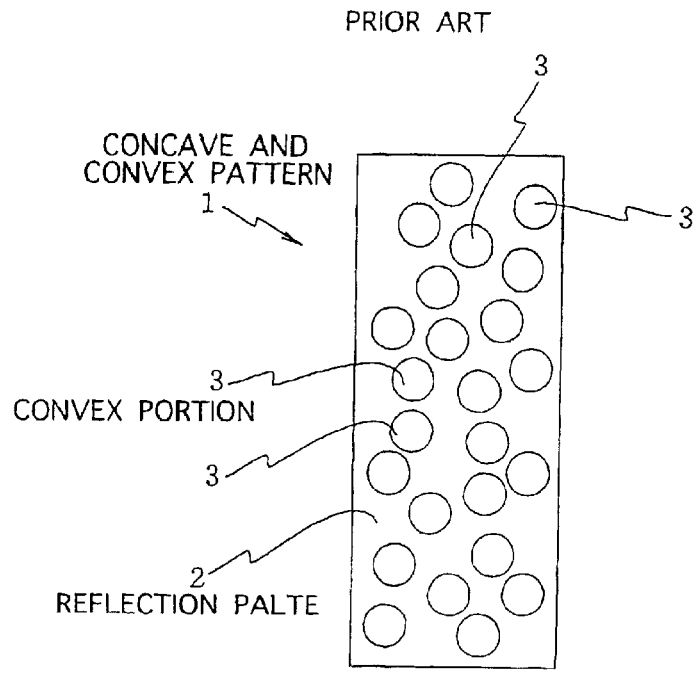
FIG. 14 is a plan view showing an example of a concave and convex pattern formed on a conventional reflection plate.
Figure 15:
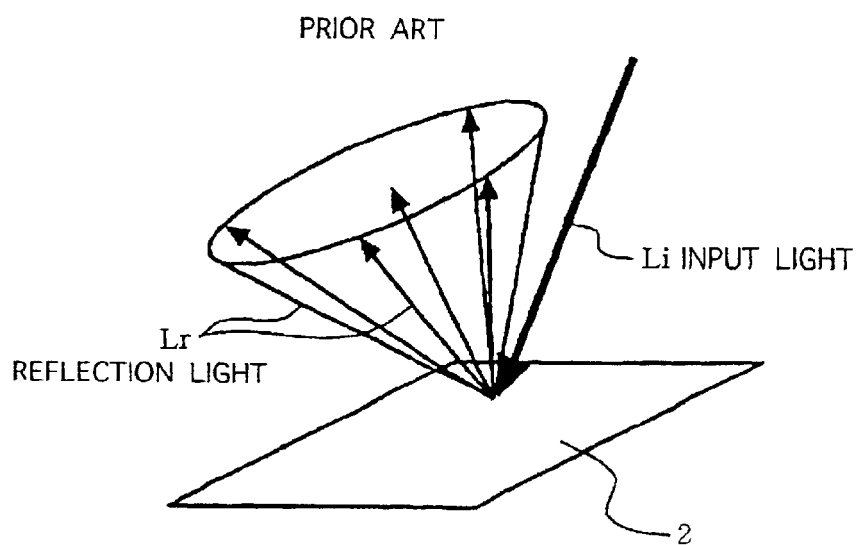
FIG. 15 is an explanation view showing a relation between an input light and a reflection light resulting from the reflection plate of FIG. 14.

FIG. 13 is a plan view showing a screen of another embodiment of the reflection plate and the reflection type liquid crystal display apparatus of the present invention. A reflection plate 33 of the present invention is concave and convex on the surface, and it is configured such that the convex portion of the concave and convex shape is triangular.

At this time, if one side of the triangle is formed so as to be substantially orthogonal to the direction through which the observer and the light source are linked, as for the reflectance on the observer side, in the property shown in FIG. 11, the azimuth in the existence of the observer is 0 degree. Thus, the greater part of the lights can be reflected to the observer side. Hence, it is possible to provide the bright reflection type liquid crystal display apparatus 32.

FIG. 13 shows the example in which the convex shape is triangular. However, the shape of the convex portion is not limited to the triangle. It may be the quadrangle or the further polygonal shape.

The method of manufacturing the reflection type liquid crystal display apparatus of the present invention will be schematically described below. As shown in FIGS. 8A to 8D, convex portions 18 (or, concave portions) patterned to triangles or further polygonal shapes by using the organic resin and the like is formed on a substrate 14 (refer to FIG. 8A) having elements such as TFTs 16 and the like (refer to FIG. 8B). Such pattern can be formed through a photo-lithography process, an etching process and the like.

Figure 8C:
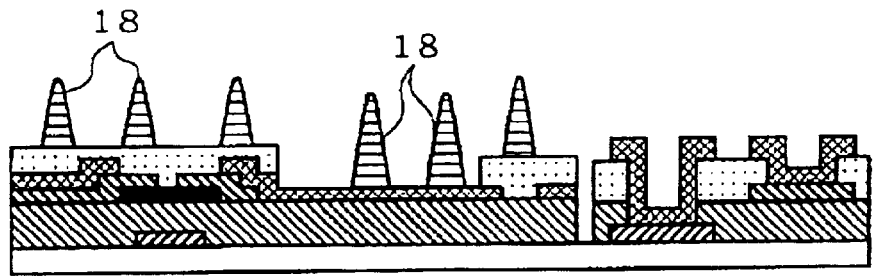

Then, the tip of the thus-formed convex portion 18 is rounded by carrying out a heat treatment and the like (refer to FIG. 8C).

Figure 8D:
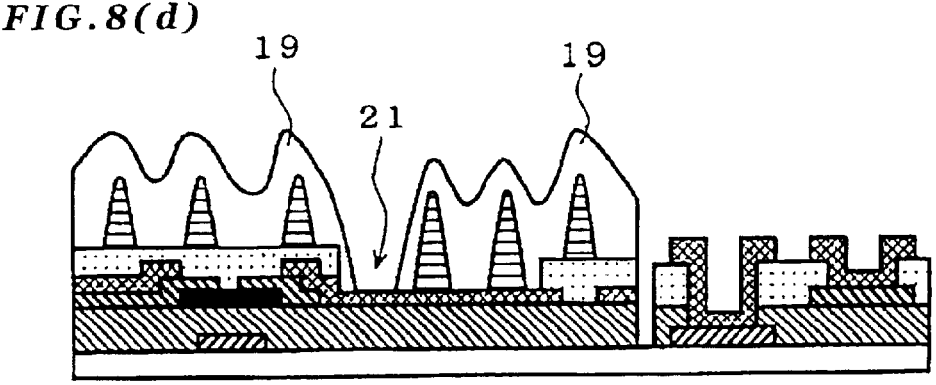

Moreover, so as to cover those convex portions 18 (or concave portions), interlayer films 19 are formed by using the organic resin and the like so that the entire portion is smoothly concave and convex (refer to FIG. 8D). At this time, a contact hole 21 is made on the interlayer film 19.

Finally, film having a high reflectance, such as Aluminum and the like, is formed on the upper portion of the interlayer film 19. Then, a pixel electrode is patterned. Accordingly, the reflection type liquid crystal display apparatus is attained as shown in FIG. 1.

As mentioned above, according to the present invention, the reflection plate used in the reflection type liquid crystal display apparatus, which uses the input light from the external portion as the display light source, can give the anisotropy to the light reflection direction to the input light from the external portion. So, it is possible to effectively use the light from the light source existing within the substantially extending plane of the line through which the screen and the observer viewing the screen are linked. Thus, it is possible to effectively use the light from the light source having the strong energy, such as the fluorescent light or the sun light, and also possible to increase the lights reflected to the observer side. Accordingly, the bright display can be obtained even under the environment having the large direct light component.

Also, the method of manufacturing the reflection plate according to the present invention can manufacture the above-mentioned reflection plate. The reflection type liquid crystal display apparatus according to the present invention can attain the reflection type liquid crystal display apparatus having the above-mentioned reflection plate. The method of manufacturing the reflection type liquid crystal display apparatus according to the present invention can attain the above-mentioned reflection type liquid crystal display apparatus.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-340171 (Filed on Nov. 8, 2000) and Japanese Patent Application No. 2001-088101 (Filed on Mar. 26, 2001) including specification, claims, drawings and summary are incorporated herein by reference in its entirety.

What is claimed is:

1. A reflection type liquid crystal display apparatus using an external input light as a display light source, comprising a reflection electrode shaped so that a reflected strength of a light input at a first angle and reflected at a second angle to said reflection plate has an anisotropy, when the reflection plate is rotated while the first and second angles are maintained.

2. A reflection type liquid crystal display apparatus according to claim 1, wherein:
   the reflection electrode has a concave and convex shape;
   a first concave portion of the concave and convex shape, is surrounded by a first convex portion of the concave and convex shape, and is formed in a shape of a polygon.

3. A reflection type liquid crystal display apparatus according to claim 2, wherein anisotropy of the reflected strength of the light is dependent upon the shape of said polygon.

4. A reflection type liquid crystal display apparatus according to claim 2, wherein a distance between vertexes of the polygon in said concave and convex shape is 5 $\mu$m or more, on average.

5. A reflection type liquid crystal display apparatus according to claim 1, wherein there are a plurality of the polygon shaped first concave portions, and these portions are arranged directly adjacent to each other.

6. A reflection type liquid crystal display apparatus comprising:
   a substrate supporting bar-shaped convex portions arranged to define borders of polygon shaped concave portions in a plan view of said substrate; and
   a reflection electrode formed on the convex portions and concave portions,
   wherein the reflection plate has anisotropic reflectivity when viewed from different directions at a constant angle to its surface.

7. A reflection type liquid crystal display apparatus as recited in claim 6, wherein ones of the bar shaped convex portions are connected and arranged to extend transversely across substrate.

8. A reflection type liquid crystal display apparatus as recited in claim 6, wherein:
   the bar shaped convex portions are connected to each other to form lines across the surface of the substrate;
   more than 22% of the bar shaped convex portions have long axes that extend toward a first transverse direction; and.

9. A reflection type liquid crystal display apparatus comprising:
   a reflection plate comprising convex and concave portions;
   wherein said convex portions are generally circularly shaped, and are arranged independently of one another in rows so that an average distance between immediately adjacent convex portions is shorter than an average distance between the rows; and
   the reflection plate has anisotropic reflectivity when viewed from different directions at a constant angle to its surface.

10. A reflection-type liquid crystal display apparatus, comprising a substrate, convex portions formed on an upper surface of the substrate, and a reflection electrode formed on the convex portions, wherein:
    the convex portions comprise individual convex shapes formed with a long axis and a short axis along the upper surface of the substrate;
    the individual convex shapes comprise first individual convex shapes having their long axes aligned along the upper surface of the substrate in a first direction.

11. A reflection-type liquid crystal display according to claim 10, wherein:
    the first individual convex shapes are aligned along the first direction when the long axis is within an angular range from +10 to −10 degrees with respect to the first direction; and
    the first individual convex shapes make up 20% or more of the whole length of one of the first, second or third lines.

12. A reflection-type liquid crystal display according to claim 10, wherein an average inclination angle of the first individual convex portions shapes is different from an average inclination angle of remaining ones of the individual convex shapes.

13. A reflection-type liquid crystal display according to claim 12, wherein said respective average inclination angles are different by 0.5 degrees or more from each other.

14. A reflection-type liquid crystal display according to claim 10, wherein:
    an effective line ratio is defined as a ratio of a sum of the length of the long axes of the individual convex shapes having short axes aligned within a predetermined angular range with respect to a base line to a sum of the length of the long axes of all of the individual convex shapes, and
    the effective line ratio is about 22% or more.

15. A reflection-type liquid crystal display according to claim 14, wherein said predetermined angular range is set from −20 degree to +20 degree with respect to said base line.

16. A reflection type liquid crystal display apparatus according to claim 10, further comprising a liquid crystal layer driven by an active matrix method, wherein a thin film transistor serves as a switching device and is installed for each pixel.

17. A reflection-type liquid crystal display apparatus according to claim 10, wherein the first individual convex shapes are directly connected to form a straight line of first individual convex shapes extending across the upper surface of the substrate along the first direction.

18. A reflection-type liquid crystal display apparatus according to claim 17, wherein the straight line extends across the entire upper surface of the substrate along the first direction.

19. A reflection-type liquid crystal display apparatus according to claim 10, wherein the individual convex shapes are bar-shaped.

20. A reflection-type liquid crystal display apparatus according to claim 10, wherein the first individual convex shapes are directly connected to form a multi-point line extending across the upper surface of the substrate along the first direction.

21. A reflection-type liquid crystal display apparatus according to claim 10, wherein:
    the individual convex shapes further comprise second individual convex shapes having long axes aligned along the upper surface of the substrate in directions other than the first direction;
    the first individual convex shapes and second individual convex shapes are directly interconnected to form polygonal shapes on the upper surface of the substrate.

22. A reflection-type liquid crystal display according to claim 21, wherein positions of vertexes of the polygonal shapes are shifted and randomly arranged.

23. A reflection-type liquid crystal display according to claim 22, wherein said polygonal shapes comprise ones of a triangle, a quadrangle, a hexagon, a rectangle, an ellipse, a U-shape, a rhombus, a V/U structure, or compressed, rotated, enlarged or contracted patterns thereof.

24. A reflection-type liquid crystal display apparatus according to claim 10, wherein the multi-point line extends across the entire upper surface of the substrate along the first direction.

25. A reflection type liquid crystal display apparatus, comprising: a reflection plate manufactured by using a mask, comprising a basic figure having an anisotropy forming an optically transparent pattern or a light shield pattern, to form individual convex shapes on a substrate, wherein the basic figure has a long axis direction and a short axis direction that are different from each other, and then forming said individual convex shapes wherein:

an external light reflected in said reflection plate is used as a display light source;

the convex portions comprise individual convex shapes formed with a long axis and a short axis along the upper surface of the substrate;

the individual convex shapes comprise first individual convex shapes having their long axes aligned alone the upper surface of the substrate in a first direction.

26. A reflection plate according to claim 25, wherein the reflection plate has anisotropic reflectivity when viewed from different directions at a constant angle to its surface.

* * * * *

UNITED STATES PATENT AND TRADEMARK OFFICE
CERTIFICATE OF CORRECTION

PATENT NO. : 6,943,856 B2
APPLICATION NO. : 09/984258
DATED : September 13, 2005
INVENTOR(S) : Yuichi Yamaguchi et al.

It is certified that error appears in the above-identified patent and that said Letters Patent is hereby corrected as shown below:

On The Title Page, Item (73) Assignee should read --(73) Assignee: NEC Corporation, Tokyo (JP); <u>NEC LCD Technologies, Ltd., Kanagawa (JP)</u> --.

Signed and Sealed this

Sixteenth Day of October, 2007

JON W. DUDAS
*Director of the United States Patent and Trademark Office*